US012548734B2

(12) United States Patent
Zur (10) Patent No.: US 12,548,734 B2
(45) Date of Patent: Feb. 10, 2026

(54) IN-LINE DEPTH MEASUREMENTS BY AFM (71) Applicant: APPLIED MATERIALS ISRAEL LTD., Rehovot (IL)

(72) Inventor: Yehuda Zur, Tel-Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 596 days.

(21) Appl. No.: 18/087,648

(22) Filed: Dec. 22, 2022

(65) Prior Publication Data

US 2024/0212976 A1 Jun. 27, 2024

(51) Int. Cl.
*H01J 37/28* (2006.01)
*H01J 37/20* (2006.01)
(Continued)

(52) U.S. Cl.
CPC ............. *H01J 37/28* (2013.01); *H01J 37/20* (2013.01); *H01J 37/222* (2013.01); *H01J 37/3056* (2013.01); *H01J 2237/208* (2013.01); *H01J 2237/2583* (2013.01); *H01J 2237/31749* (2013.01)

(58) Field of Classification Search
CPC .......... H01J 37/244; H01J 37/09; H01J 37/24; H01J 2237/0266; H01J 2237/2443; H01J 2237/2445; H01J 2237/2605; H01J 37/28; H01J 2237/24495
See application file for complete search history.

(56) References Cited

U.S. PATENT DOCUMENTS 5,804,460 A 9/1998 Bindell et al.
6,670,610 B2 12/2003 Shemesh et al.
(Continued)

FOREIGN PATENT DOCUMENTS

| JP | 6374035 B2 * | 8/2018 | ............ H01J 37/305 |
| KR | 20110021822 A | 3/2011 | |
| WO | WO-2018140903 A2 * | 8/2018 | ......... G01N 23/2251 |

OTHER PUBLICATIONS

PCT/US2023/085239, "International Search Report and Written Opinion", Apr. 30, 2024, 12 pages.
(Continued)

*Primary Examiner* — David A Vanore
(74) *Attorney, Agent, or Firm* — Kilpatrick Townsend & Stockton LLP (57) ABSTRACT A method of evaluating a region of interest of a sample with a sample evaluation tool that includes a focused ion beam (FIB) column, a scanning electron microscope (SEM) column, and an atomic force microscope (AFM) instrument, the method comprising: transferring the sample into in a vacuum chamber of the sample evaluation tool; acquiring a plurality of two-dimensional images of the region of interest over a plurality of iterations of a delayering process by: (a) positioning the region of interest under a field of view of the FIB column; (b) milling a layer of material from the region of interest with the FIB column; (c) moving the region of interest under a field of view of the SEM column; (d) imaging the region of interest with the SEM column and measuring a depth of the milled layer in the region of interest with the AFM instrument; and repeating steps (a)-(d) a plurality of times without removing the sample from the vacuum chamber.

20 Claims, 6 Drawing Sheets (51) Int. Cl.
*H01J 37/22* (2006.01)
*H01J 37/305* (2006.01)

(56) References Cited

U.S. PATENT DOCUMENTS

| | | | | |
|---|---|---|---|---|
| 7,312,448 | B2* | 12/2007 | Principe | G01N 1/32 |
| | | | | 250/201.3 |
| 8,709,269 | B2 | 4/2014 | Shemesh | |
| 10,879,035 | B2* | 12/2020 | Mizuno | H01J 37/3056 |
| 2007/0158562 | A1* | 7/2007 | Nasser-Ghodsi | H01J 37/28 |
| | | | | 250/310 |
| 2013/0094716 | A1* | 4/2013 | Carpio | G06T 7/38 |
| | | | | 382/109 |
| 2013/0174301 | A1 | 7/2013 | Robinson | |
| 2014/0226003 | A1* | 8/2014 | Phaneuf | H01J 37/28 |
| | | | | 348/80 |
| 2016/0307729 | A1* | 10/2016 | Lazic | H01J 37/28 |
| 2018/0218878 | A1* | 8/2018 | Xu | H01J 37/28 |
| 2020/0152420 | A1* | 5/2020 | Williamson | H01J 37/261 |
| 2020/0384592 | A1* | 12/2020 | Zur | B23Q 15/225 |
| 2021/0073992 | A1* | 3/2021 | Konishi | G06V 10/764 |
| 2021/0082664 | A1* | 3/2021 | Zur | H01J 37/3023 |
| 2021/0374927 | A1 | 12/2021 | Liu et al. | |
| 2022/0107332 | A1 | 4/2022 | Liu et al. | |
| 2022/0415610 | A1* | 12/2022 | Blayvas | H01J 37/265 |
| 2023/0019567 | A1* | 1/2023 | Mairov | H01J 37/3045 |
| 2023/0245933 | A1* | 8/2023 | Jiang | B23K 15/0013 |
| | | | | 438/5 |

OTHER PUBLICATIONS

PCT/US2023/085239, "International Preliminary Report on Patentability", Jul. 3, 2025, 9 pages.

* cited by examiner

IN-LINE DEPTH MEASUREMENTS BY AFM

BACKGROUND OF THE INVENTION

In the study of electronic materials and processes for fabricating such materials into an electronic structure, a specimen of the electronic structure can be used for microscopic examination for purposes of failure analysis and device validation and metrology. For instance, a specimen of an electronic structure such as a silicon wafer can be analyzed in a scanning electron microscope (SEM) to study a specific characteristic feature in the wafer. Such a characteristic feature may include the circuit fabricated and any defects formed during the fabrication process. An electron microscope is one of the most useful pieces of equipment for analyzing the microscopic structure of semiconductor devices.

In preparing specimens of an electronic structure for electron microscopic examination, various polishing and milling processes can be used to section the structure until a specific characteristic feature is exposed. As device dimensions are continuously reduced to the nanometer scale, the techniques for preparing specimens for study in an electron microscope have become more important. The conventional methods for studying structures by an optical microscope cannot be used to study features in a modern electronic structure due to the unacceptable resolution of an optical microscope.

SEM imaging techniques can be used to see a surface of a region of interest (ROI) within a specimen and can also be used to see the bulk of the material within the ROI. For example, a ROI on a specimen can be bombarded with ions of Xenon, Gallium or other elements generated by a focused ion beam (FIB) column to erode the surface layer of the specimen in the ROI, thus allowing layers within the ROI below the surface, and initially covered by material above, to be imaged.

A dual column system incorporating both a scanning electron microscope and a focused ion beam (FIB) unit can produce high resolution SEM images of a localized area of an electronic structure formed on a sample, such as a semiconductor wafer. A typical dual column system includes an SEM column, an FIB column, a supporting element that supports the sample and a vacuum chamber in which the sample is placed while being milled (by the FIB column) and while being imaged (by the SEM column).

Removing one or more selected layers (or a portion of a layer) to uncover or isolate a portion of the specimen is known as delayering and can be done in a dual column system, such as that described above. For example, delayering can be done by: (i) locating a region of interest that should be milled in order to remove a certain thickness of material from the specimen, (ii) moving the sample (e.g., by a mechanical supporting element) so that the specimen is located under the FIB unit, and (iii) milling the specimen to remove a desired amount of material in the region of interest. The above steps of a delayering process can be repeated many times (e.g., tens or hundreds or thousands of times) forming a hole (sometimes referred to as a box) in the specimen usually sized a few microns to few tens of microns in lateral and vertical dimensions.

By taking SEM images of the surface every few nanometers of the delayering process, tens to hundreds or more images, each representing a "slice" of the region, can be collected at various depth intervals throughout the delayering process creating a three-dimensional image of the delayered region of interest. Furthermore, by applying Energy-Dispersive X-ray spectroscopy (EDX), the exact chemical composition of the sample structures within the region of interest can be measured at different depths.

For a three-dimensional image of the delayered region created by such a process to be highly accurate, the depth of each slice needs to be know with a high level of precision.

BRIEF SUMMARY OF THE INVENTION

Embodiments described herein provide improved systems and methods for generating highly accurate three-dimensional images of the delayered region. Embodiments can use an atomic force microscope, positioned within the same vacuum chamber as a scanning electron microscope (SEM) column, to measure the depth at which each slice of the delayering process is removed with a very high level of precision. The different slices can then be aligned and stacked upon each other to create the three-dimensional image. While embodiments of the disclosure can be used to delayer structures formed on a variety of different types of samples, some embodiments are particularly useful in delayering samples that are semiconductor wafers or similar specimens.

In some embodiments, a method of evaluating a region of interest of a sample with a sample evaluation tool that includes a focused ion beam (FIB) column, a scanning electron microscope (SEM) column, and an atomic force microscope (AFM) instrument is provided. The method includes: transferring the sample into in a vacuum chamber of the sample evaluation tool; acquiring a plurality of two-dimensional images of the region of interest over a plurality of iterations of a delayering process by: (a) positioning the region of interest under a field of view of the FIB column; (b) milling a layer of material from the region of interest with the FIB column; (c) moving the region of interest under a field of view of the SEM column; (d) imaging the region of interest with the SEM column and measuring a depth of the milled layer in the region of interest with the AFM instrument; and repeating steps (a)-(d) a plurality of times without removing the sample from the vacuum chamber.

A system for evaluating a region of a sample is provided in some embodiments. The system can include: a vacuum chamber; a focused ion beam (FIB) column configured to direct a charged particle beam into the vacuum chamber toward the sample; a scanning electron microscope (SEM) column configured to direct a charged particle beam into the vacuum chamber toward the sample; a sample support configured to hold a sample within the vacuum chamber during a sample evaluation process and move the sample between a field of view of the FIB column and the SEM column; an atomic force microscope (AFM) instrument configured to measure a height of features on the sample while the sample is positioned on the sample support; and a processor and a memory coupled to the processor. The memory can include a plurality of computer-readable instructions that, when executed by the processor, cause the system to: transfer the sample into in the vacuum chamber; and acquire a plurality of two-dimensional images of a region of interest on the sample over a plurality of iterations of a delayering process by: (a) positioning the region of interest under a field of view of the FIB column; (b) milling a layer of material from the region of interest with the FIB column; (c) moving the region of interest under a field of view of the SEM column; (d) imaging the region of interest with the SEM column and measuring a depth of the milled layer in the region of interest with the AFM instrument; and repeating steps (a)-(d) a plurality of times without removing the sample from the vacuum chamber.

In some embodiments a non-transitory computer-readable memory that stores a plurality of computer-readable instructions for evaluating a region of interest on a sample is provided. The instructions can, when implemented by a processor, cause a sample evaluation tool that includes a focused ion beam (FIB) column, a scanning electron microscope (SEM) column, and an atomic force microscope (AFM) instrument, to: transfer the sample into in a vacuum chamber of the sample evaluation tool; and acquire a plurality of two-dimensional images of the region of interest over a plurality of iterations of a delayering process by: (a) positioning the region of interest under a field of view of the FIB column; (b) milling a layer of material from the region of interest with the FIB column; (c) moving the region of interest under a field of view of the SEM column; (d) imaging the region of interest with the SEM column and measuring a depth of the milled layer in the region of interest with the AFM instrument; and repeating steps (a)-(d) a plurality of times without removing the sample from the vacuum chamber.

In various implementations embodiments can include one or more of the following features. The method can include generating a three-dimensional data cube representing the region of interest by stacking the plurality of two-dimensional images on top of each other in an order in which they were acquired. A a height of each two-dimensional image that is part of the three-dimensional data cube can be determined by AFM measurements. Acquiring a plurality of two-dimensional images of the region of interest further can include aligning the plurality of two-dimensional images to each other prior to generating the three-dimensional data cube. The sample can be a semiconductor wafer.

Additionally, in various implementations, during each iteration of the delaying process, one or more of the following can be done. Milling a layer of material from the region of interest with the FIB column can include scanning a focused ion beam generated by the FIB column across the region of interest a plurality of times prior to moving the region of interest under the field of view of the SEM column. An image of a milled layer can be generated with the SEM column immediately prior to measuring a depth of the milled layer with the AFM instrument. A depth of the milled layer with the AFM instrument can be measured immediately prior to generating an image of a milled layer with the SEM column.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION OF THE INVENTION

Embodiments described herein provide improved systems and methods for generating highly accurate three-dimensional images of the delayered region. Embodiments can use an atomic force microscope (AFM), positioned in situ (within the same vacuum chamber) as a scanning electron microscope (SEM) column, to measure the depth at which each slice of the delayering process is removed with a very high level of precision. The different slices can then be aligned and stacked upon each other to create the three-dimensional image. While embodiments of the disclosure can be used to delayer structures formed on a variety of different types of samples, some embodiments are particularly useful in delayering samples that are semiconductor wafers or similar specimens.

Example Sample Evaluation System

Figure 1A:
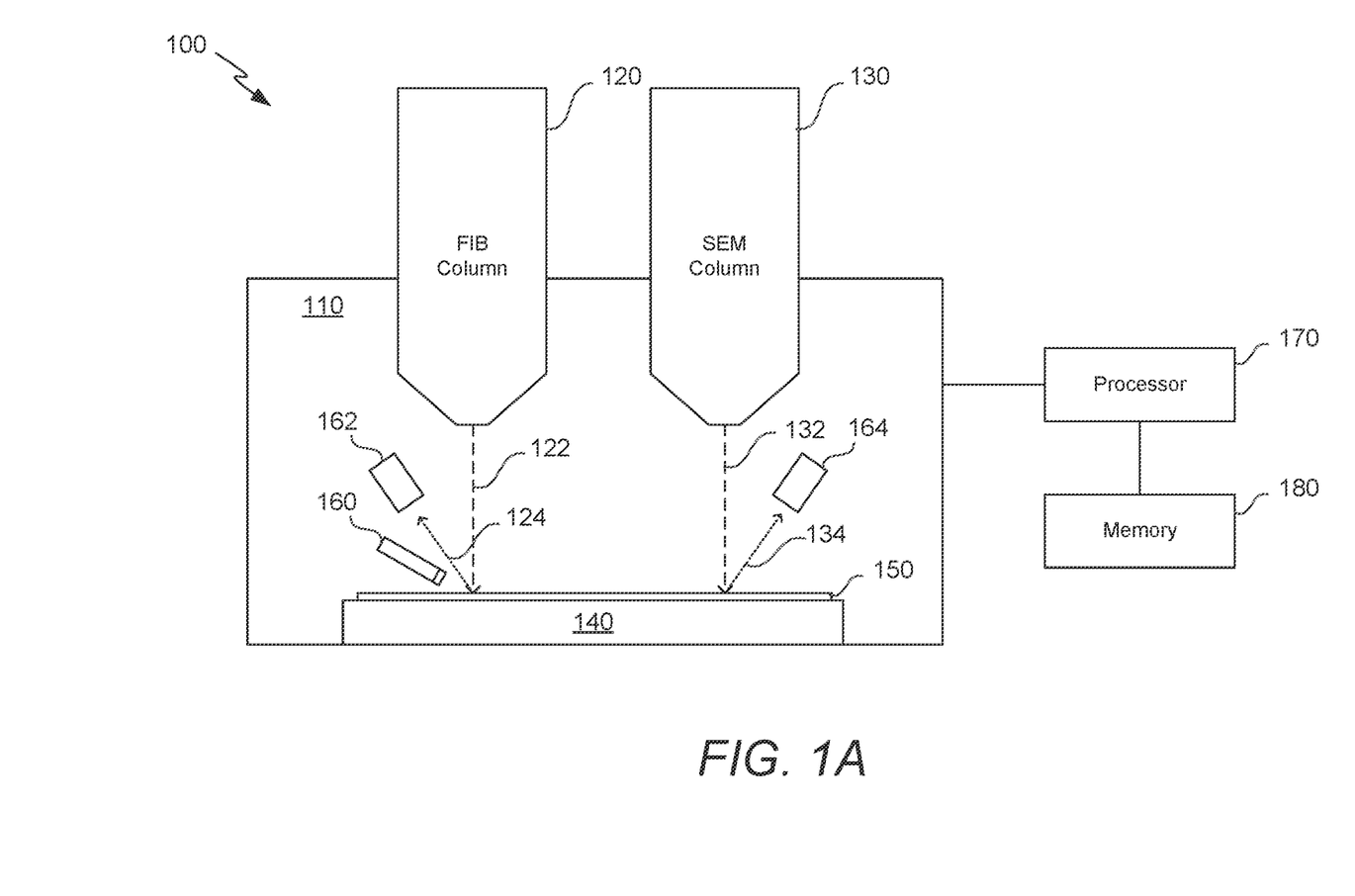
FIG. 1A is a simplified illustration of a sample evaluation system according to some embodiments of the disclosure.

In order to better understand and appreciate the disclosure, reference is first made to FIG. 1A, which is a simplified schematic illustration of a sample evaluation system 100 in accordance to some embodiments of the disclosure. Sample evaluation system 100 can be used for, among other operations, defect review and analysis of structures formed on samples such as semiconductor wafers.

As shown in FIG. 1A, sample evaluation system 100 can include, among other elements, a vacuum chamber 110, a focused ion beam (FIB) column 120, a scanning electron microscope (SEM) column 130, a sample supporting element 140, a gas injection nozzle 160 and, optionally, secondary electron detectors 162, 164 (or in some embodiments, secondary ion detectors, or a combination of the two detectors working in parallel). FIB column 120 and SEM column 130 are connected to vacuum chamber 110 so that a charged particle beam generated by either one of the charged particle columns propagates through a vacuumed environment formed within vacuum chamber 110 before impinging on sample 150. For example, FIB column 120 is operable to generate a charged particle beam 122 and direct the charged particle beam 122 towards a sample 150 (sometimes referred to herein as an "object" or a "specimen") to mill or otherwise process the sample. SEM column 130 can generate an image of a portion of sample 150 by illuminating the sample with a charged particle beam 132, detecting particles emitted due to the illumination, and generating charged particle images based on the detected particles.

The sample 150, for example a semiconductor wafer, can be supported on the sample supporting element 140 within vacuum chamber 110. Sample supporting element 140 can also move regions of the sample within vacuum chamber 110 between the field of view of the two charged particle columns 120 and 130 as required for processing. For example, the FIB column 120 can be used to mill a region on the sample 150 and the supporting element 140 can then move the sample so that the SEM column 130 can image the milled region of the sample 150.

FIB column 120 can mill (e.g., drill a hole in) sample 150 by irradiating the sample with one or more charged particle beams to form a cross section or a hole. An FIB milling process typically operates by positioning the specimen in a vacuum chamber 110 and emitting a beam of ions towards the specimen to etch or mill away material on the specimen. Common milling processes form a cross section of the sample 150 and, if desired, can also smooth the cross section. In some instances, the vacuum environment can be purged with background gases that serve to control the etch speed and other parameters. The accelerated ions can be generated from Xenon, Gallium or other appropriate elements and are typically accelerated towards the specimen by voltages in the range of 500 volts to 100,000 volts, and more, typically falling in the range of 3,000 volts to 30,000 volts. The beam current is typically in the range from several pico amps to several micro amps, depending on the FIB instrument configuration and the particular application, and the pressure is typically controlled between $10^{-10}$ to $10^{-5}$ mbar in different parts of the system and in different operation modes.

During a milling operation, the charged particle beam 122 generated by the FIB column 120 propagates through a vacuum environment formed within vacuum chamber 110 before impinging on the sample 150. Secondary electrons and ions 124 are generated in the collision of ions with the sample and can be detected by the detector 162. The detected secondary electrons or ions 124 can be used to analyze characteristics of the milled layers and the structure, can be used to determine an endpoint of a milling process, and/or can be used to form an images.

During a particle imaging operation, the charged particle beam 132 generated by the SEM column 130 propagates through the vacuum environment formed within the vacuum chamber 110 before impinging on the sample 150. Secondary electrons 134 are generated in the collision of electrons with the sample 150 and can be detected by the detector 164. The detected secondary electrons 134 can be used to form images of the milled area and/or to analyze characteristics of the milled layers and the structure.

Particle imaging and milling processes each typically include scanning a charged particle beam back-and-forth (e.g., in a raster scan pattern) at a constant rate across a particular area of the sample being imaged or milled. One or more lenses (not shown) coupled to the charged particle column can implement the scan pattern as is known to those of skill in the art. The area scanned is typically a very small fraction of the overall area of sample. For example, the sample can be a semiconductor wafer with a diameter of either 200 or 300 mm while each area scanned on the wafer can be a rectangular area having a width and/or length measured in microns or tens of microns.

During some processing operations, one or more gases can be delivered into chamber 110 by a gas injection system 160. For simplicity of explanation gas injection system 160 is illustrated in FIG. 1 as a nozzle, but it is noted that gas injection system 160 can include gas reservoirs, gas sources, valves, one or more inlets and one or more outlets, among other elements. In some embodiments gas injection system 160 can be configured to deliver gas to a localized area of sample 150 that is exposed to the charged particle beam as opposed to delivering gas to an entire upper surface of the sample. For example, in some embodiments gas injection system 160 has a nozzle diameter measured in hundreds of microns (e.g., between 400-500 microns) that is configured to deliver gas directly to a relatively small portion of the sample's surface that encompasses the charged particle beam scan pattern or collision zone. In various embodiments, a first gas injection system 160 can be configured to deliver gas to a sample disposed under FIB column 120 and a second gas injection system 160 (not shown) can be configured to deliver gas to a sample disposed under SEM column 130.

As shown in FIG. 1A, system 100 can include one or more controllers, processors or other hardware units 170 that control the operation of system 100 by executing computer instructions stored in one or more computer-readable memories 180 as would be known to persons of ordinary skill in the art. By way of example, the computer-readable memories can include a solid-state memory (such as a random access memory (RAM) and/or a read-only memory (ROM), which can be programmable, flash-updateable and/or the like), a disk drive, an optical storage device or similar non-transitory computer-readable storage mediums.

Figure 1B:
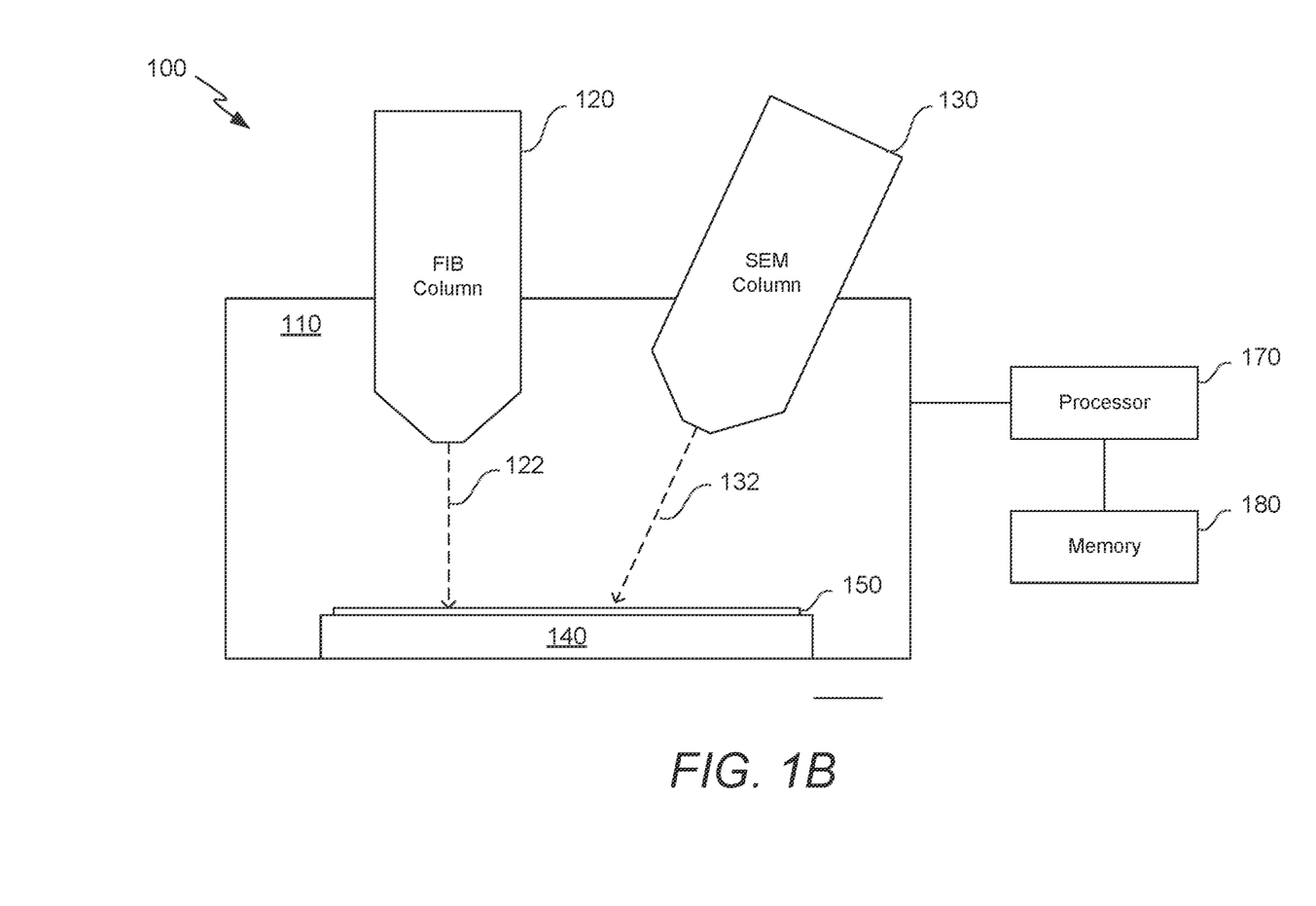
FIG. 1B is simplified illustration of a sample evaluation system shown in FIG. 1A with the SEM column tilted according to some embodiments.

FIG. 1B shows the substrate inspection system 100 with the SEM column 130 tilted. In some embodiments, SEM column 130 can be tilted relative to a surface of the sample 150 to obtain images from different angles relative to a surface of sample 150 (or from different perspectives). Alternatively, in some embodiments, the supporting element 140 can be configured to tilt the sample 150 so that images can be obtained from different angles. Gas nozzle 160 and detectors 162, 164 are not shown in FIG. 1B for ease of illustration.

Embodiments disclosed herein incorporate an atomic force microscope directly into the same vacuum chamber in which an SEM column can process a sample. For example, embodiments can include an AFM tool in vacuum chamber 110 of inspection system 100, and in some embodiments, the AFM tool can be attached directly to the SEM column. The AFM can then be used to measure the depth of the milled hole on each instance when the SEM column images the hole providing a highly accurate measurement of the hole depth.

In Situ Atomic Force Microscope

Figure 2:
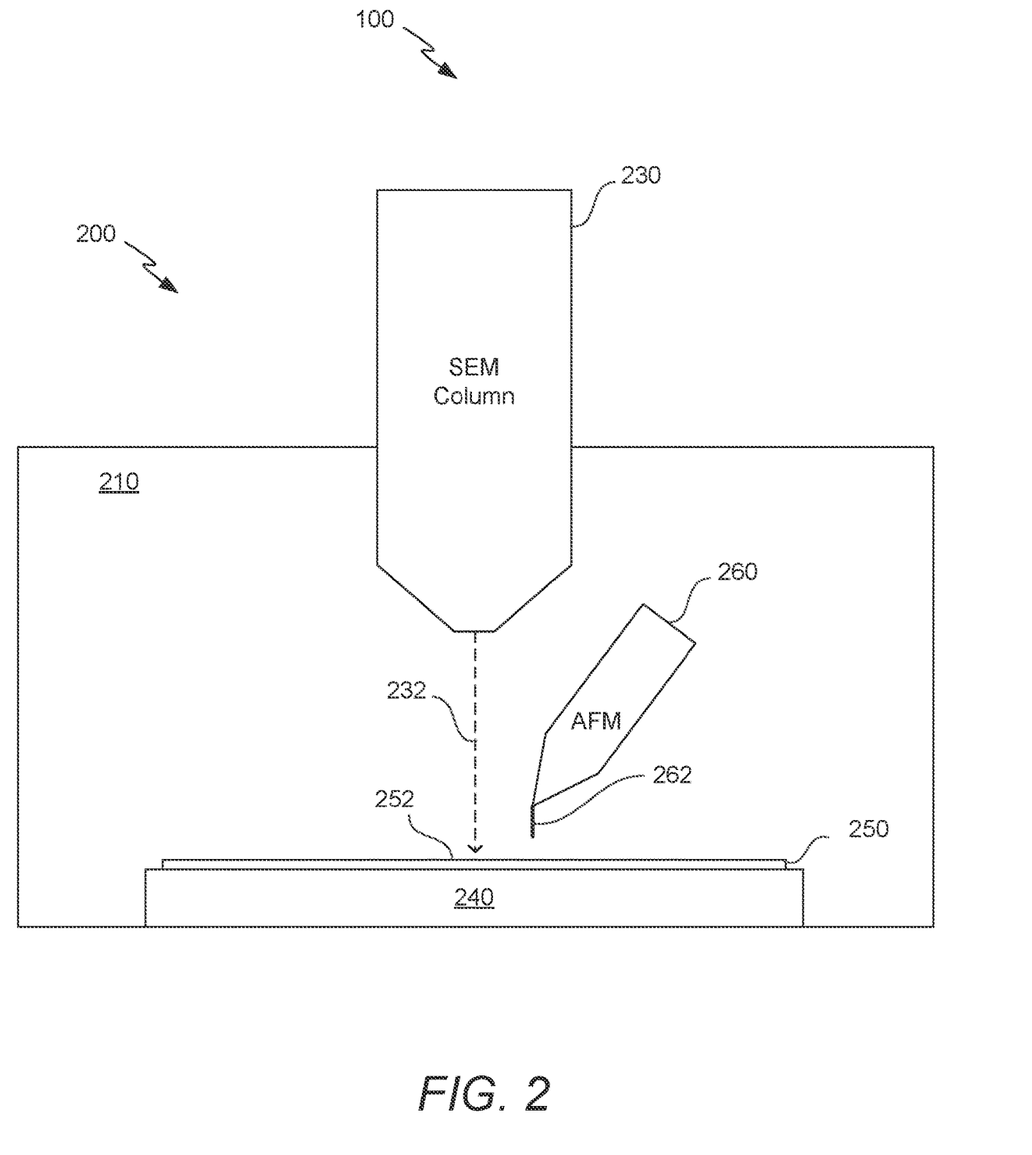
FIG. 2 is a simplified illustration of a sample evaluation system according to some embodiments of the disclosure.

FIG. 2 is a simplified illustration of a sample evaluation system 200 according to some embodiments of the disclosure. As shown in FIG. 2, evaluation system 200 includes a vacuum chamber 210, an SEM column 230, a sample support 240 on which a sample 250 can be positioned, and an AFM 260. While, for ease of illustration, system 200 is depicted in FIG. 2 as including an SEM column 230 without an FIB column, it is to be understood that in some embodiments, evaluation system 200 can be representative of evaluation system 100 depicted in FIGS. 1A and 1B, and thus include both an FIB and an SEM column. Thus, vacuum chamber 210 can be representative of vacuum chamber 110, SEM column 230 can be representative of SEM column 130, sample support 240 can be representative of sample support 140 and sample 250 can be representative of sample 150.

Figure 3:
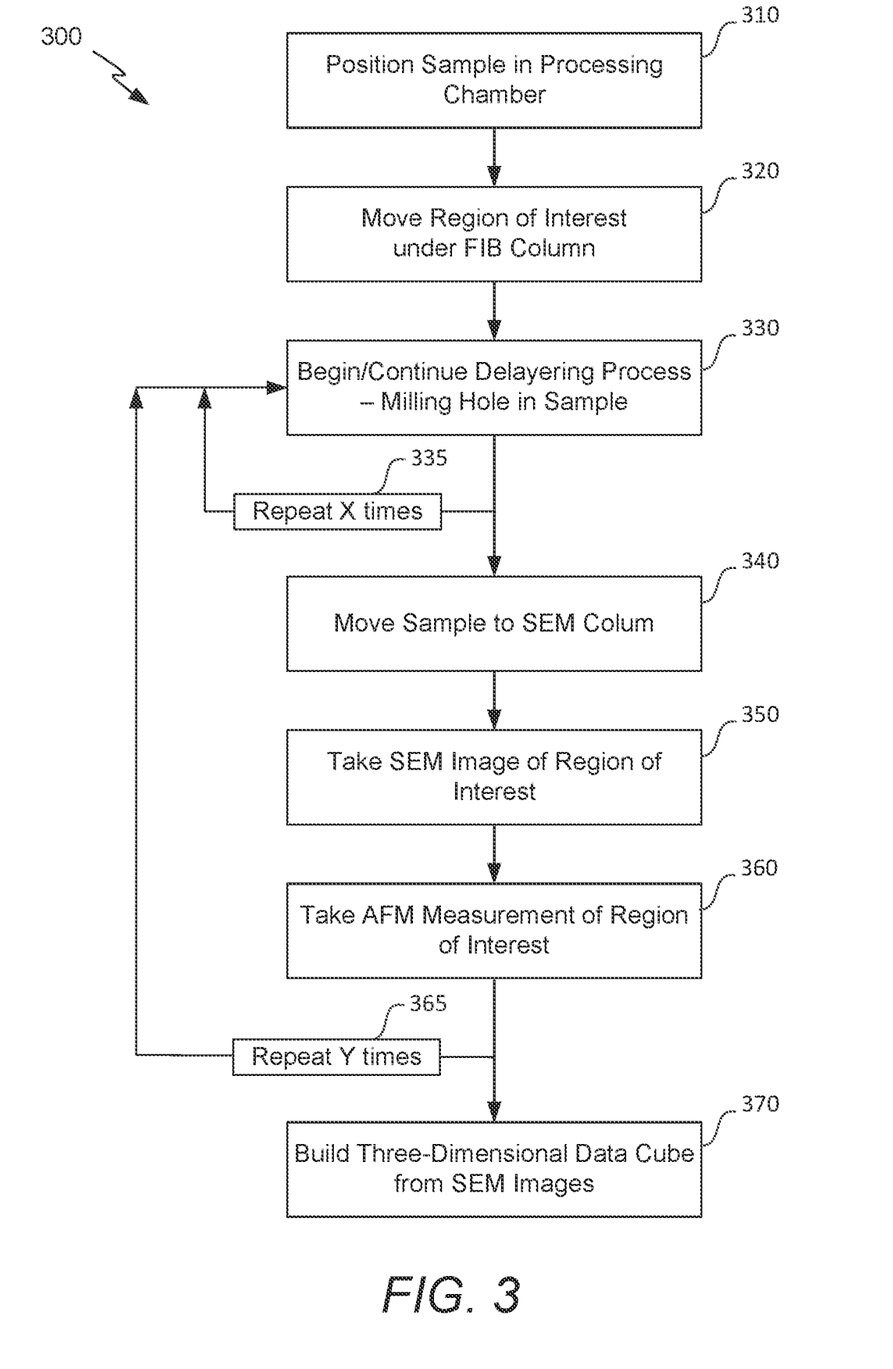
FIG. 3 is a simplified flowchart depicting steps associated with a method according to some embodiments.
Figure 4A:
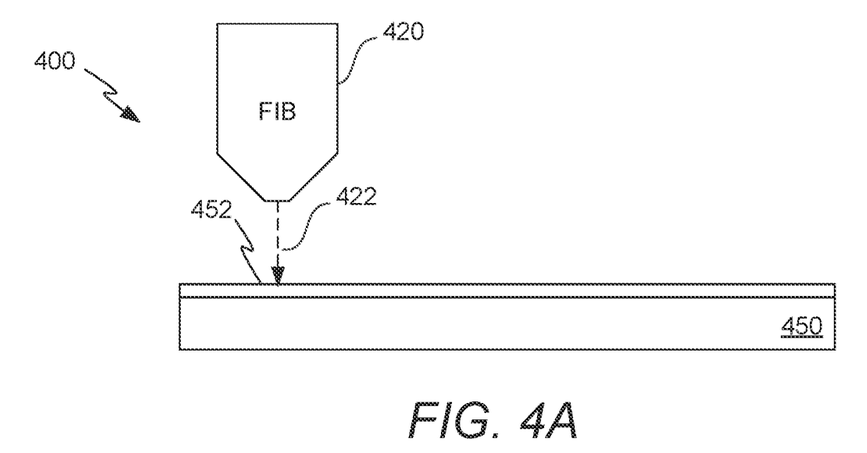
FIGS. 4A-4C are simplified cross-sectional views of a sample at different states of processing within a sample evaluation system in accordance with method depicted in FIG. 3 according to some embodiments.
Figure 4B:
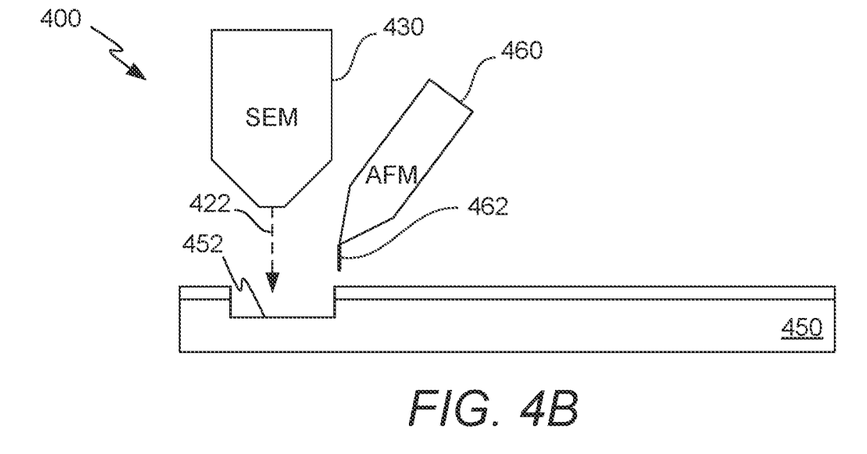
Figure 4C:
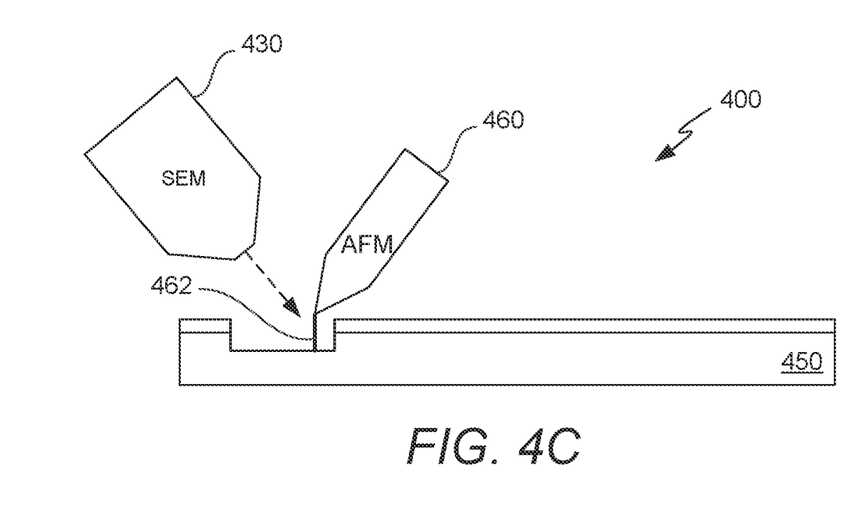

AFM 260 includes a tip 262 that can be brought in contact with an upper surface 252 of sample 250 (e.g., the upper surface of a hole being milled in sample 250) to measure the height of surface 252 (e.g. the depth of a hole being milled) with nanometer accuracy. To illustrate, reference is made to FIGS. 3 and 4A-4C in which FIG. 3 is a flowchart depicting steps associated with a method 300 according to some embodiments and FIGS. 4A-4C are simplified cross-sectional views of a sample 450 at different states of processing within a sample evaluation system 400 in accordance with method 300. As shown in FIGS. 4A-4C, sample evaluation system 400 can be representative of sample evaluation systems 100 and 200 discussed above. For ease of illustrations, however, only portions of sample evaluation system 400 necessary to illustrate certain steps of method 300 are depicted in FIGS. 4A-4C.

As shown in FIG. 3, method 300 can start by positioning sample 450 in the vacuum chamber (not shown) of sample evaluation system 400 (block 310) and then moving a region of interest 452 (i.e., the region on the sample to be delayered) within a field of view of focused ion beam (FIB) column 420, which can be representative of FIB column 120 from FIG. 1 (block 320 and FIG. 4A). A focused ion beam 422 can then be scanned across the region of interest 452 (ROI) to remove (delayer) a very thin layer from sample 450 (block 330). Because each layer removed is so thin, in some embodiments charged particle beam 422 can be scanned across the ROI 452 multiple times (e.g., hundreds or thousands of times) to remove additional material prior to an imaging step (block 335).

Next, sample 450 is moved away from the FIB column 420 to an SEM column 430, which can be representative of SEM column 230, and the ROI 452 is positioned under the field of view of the SEM column 430 (block 340, FIG. 4B). ROI 452 can then be scanned with an electron beam 432 and an SEM image of ROI 452 can be captured (block 350). The captured image can be saved in a computer-readable memory (e.g., memory 180) and used at the end of the sample evaluation process to create a three-dimensional data cube of the region of interest.

Next, the depth of each slice can be measured by an atomic force microscope 460, which can be representative of AFM 260, (block 360, FIG. 4C) prior to milling the next slice of ROI 452. Atomic force microscope 460 can measure the milled depth within ROI 452 by contacting an upper surface of ROI 452 with tip 462. AFM 460 can be aligned with SEM column 430 and top 462 can be brought into contact with the surface of ROI 452 by moving either or both sample 450 (e.g., with the sample support, not shown) and/or AFM 460. For example, in some embodiments AFM 460 can be positioned in physical proximity to the SEM column but have its own set of moving motors such that the tip 462 can be moved with respect to SEM column 430 to enable the tip 462 to contact the upper surface of ROI 452 (as shown in FIG. 4C) during the AFM measurement operation as shown in FIG. 4C and enable the tip to be raised away from the surface of ROI 452 (as shown in FIG. 4B) during the SEM imaging operation. In some other embodiments, AFM 460 can be aligned with and in a fixed relationship with SEM column 430 and the sample 450 can be moved (e.g., by sample support 240) such that an upper surface of the milled ROI 452 is in contact with tip 462. In either case, once tip 462 is properly positioned with respect to the ROI, AFM 460 can measure precisely measure the depth of the current slice and the sample evaluation system can record that depth with respect to the SEM image taken in step 350.

While method 300 is shown in FIG. 3 with the AFM measurement step 360 occurring directly after an SEM image is taken in step 350, the order of steps 350 and 360 can be reversed. That is, in some embodiments, the AFM measurement step can occur prior to the SEM image step such that the order of steps 340-360 is instead: move sample to SEM column (block 340), next take AFM measurement of region of interest (block 360), and next take SEM image of region of interest (block 350) before returning to step 330 or moving onto building the three-dimensional data cube.

In order to make a three-dimensional data cube of the ROI, many additional SEM images can be captured at different depths of the sample. Thus, the delayering, image taking and AFM measurement steps discussed above can be repeated multiple times (e.g., many tens or hundreds or more times) depending on the requirements of a given evaluation process (block 365).

As evident from the discussion above, the sample is moved in method 300 between the FIB column 420 to the SEM column 430 for each SEM image. While evaluation tool 400 enables highly precise movement and control of the sample, the SEM images resolution can reach 1 nm or less, and therefore a difference in sample location of just a few nanometers results in SEM images that are not aligned properly and can adversely impact any model that is created from the images. Thus, in order to build a three-dimensional data cube (block 370), the different SEM images taken during block 350 can be registered to (aligned with) each other. Registration can be done in several different ways. In some embodiments, an anchor-based alignment approach can be employed. For example, each SEM image taken in block 350 can be an image that captures the ROI along with one or more features of the sample outside the region of interest (and therefore not within the region that is delayered) that can be identified as unique in the SEM (e.g., feature 530 shown in FIG. 5 discussed below) and thus considered as anchor for each image. The anchor can then be used to align images after the images have been taken. For example, two images can be aligned by using an image translation in which the anchor feature in one is compared to (e.g., subtracted from) the anchor feature in the other and adjustments are made (one image is moved with respect to the other) until it is determined the anchor feature in the compared images are precisely aligned (e.g., there are zero differences in the comparison). Practical methods may differ from this simplified explanation, and employ image processing techniques such as Fourier Transform to accelerate the image registration algorithms as known in the art.

In other embodiments the anchor can be used to precisely align each image to the anchor prior to capturing the image. For example, two SEM images can be taken of the sample in block 350 where a first SEM image is taken of an area of the sample that includes the anchor (e.g., feature 530 shown in FIG. 5). This first image can, but does not need to include the ROI. Then, using image registration or pattern recognition techniques, the precise location of the anchor can be identified in the SEM image. Next, without moving the sample and based on the known location of the ROI with respect to the anchor, the electron beam can be directed to and scanned across ROI using the lenses within the SEM column to capture an SEM image of the ROI. This technique can be used for each SEM image of the ROI taken in block 350 such that the images, as taken, are preregistered to each other and additional alignment is not required. In still other embodiments, image-based registration techniques can be used to register the multiple images to each other.

Once the images have been registered to each other, the three-dimensional data cube can be compiled by stacking successive images on top of one another (block 370). Because the precise depth at which each image was taken is known from the AFM measurements in step 360, the compiled three-dimensional data cube can be a very accurate representation of the block of material that was removed from sample 450 by the delayering process.

While not shown in FIG. 3, in some embodiments method 300 can further include adding EDX data to the data cube. For example, EDX composition measurements can be performed using low-resolution, fast EDX on a selected subset of the delayering slices taken during block 330. The three-dimensional data cube can be segmented into different regions and the results of the low-resolution, fast EDX measurements can be used to average the composition of the segmented regions and label each accordingly.

Example of a Sample to be Delayered

Figure 5:
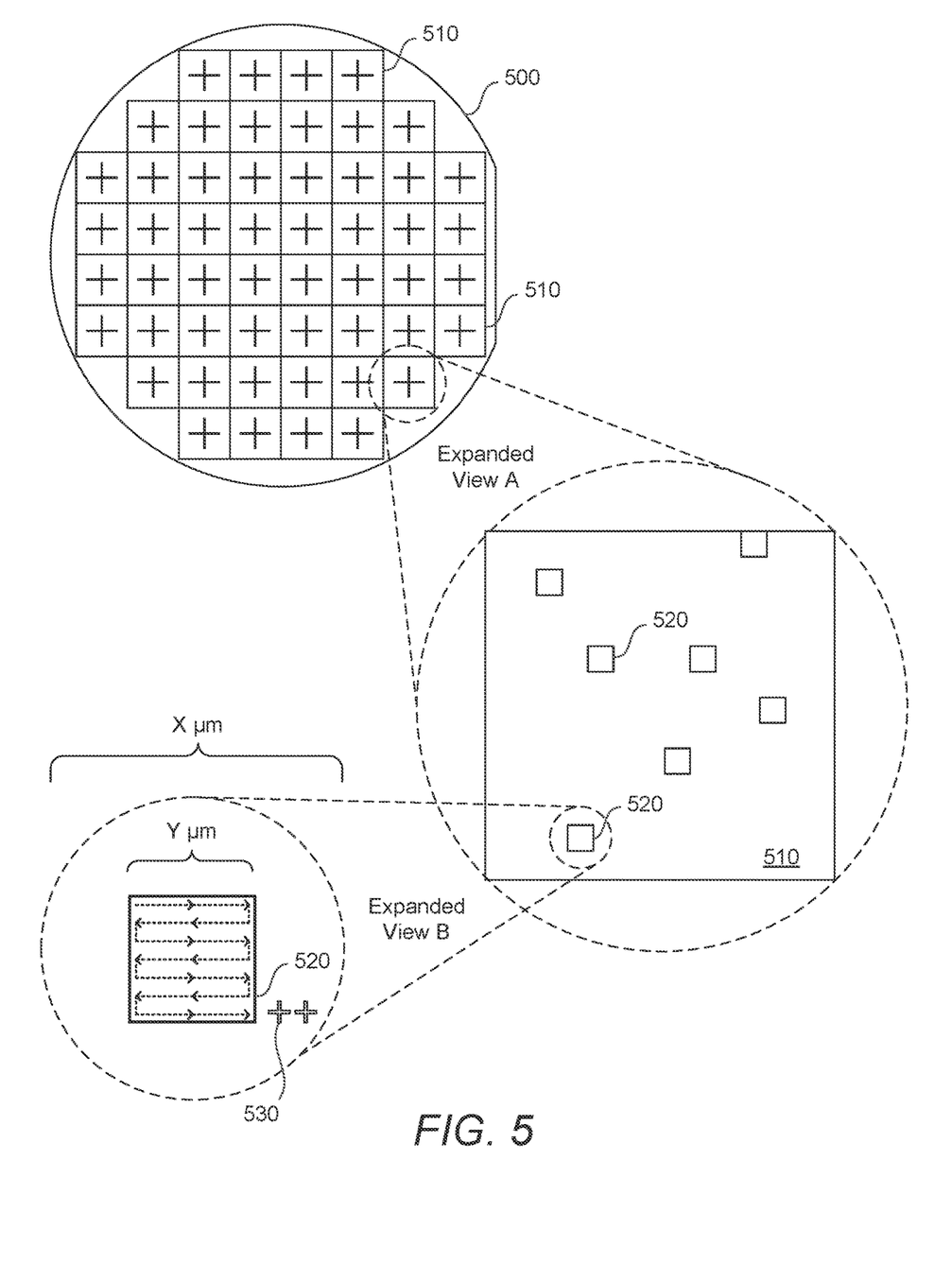
FIG. 5 is a simplified illustration of an area on a semiconductor wafer from which three-dimensional images of one or more regions of the wafer can be generated according to some embodiments.

As stated above, embodiments of the disclosure can be used to delayer and form a three-dimensional image of one or more regions within many different types of samples including electronic circuits formed on semiconductor structures, solar cells formed on a polycrystalline or other substrate, nanostructures formed on various substrates and the like. As one non-limiting example, FIG. 5 is a simplified illustration of an area on a semiconductor wafer from which three-dimensional images of one or more regions of the wafer can be generated according to some embodiments. Specifically, FIG. 5 includes a top view of wafer 500 along with two expanded views of specific portions of wafer 500. Wafer 500 can be, for example, a 200 mm or 300 mm semiconductor wafer and can include multiple integrated circuits 510 formed thereon. The integrated circuits 510 can be at an intermediate stage of fabrication and the techniques described herein can be used to evaluate and analyze one or more regions 520 of the integrated circuits including regions that have two or more sub-regions having different geometries and thus exhibit different milling rates. For example, Expanded View A of FIG. 5 depicts multiple regions 520 of one of the integrated circuits 510 that can be evaluated and analyzed according to the techniques described herein. Expanded View B depicts one of those regions 520. Also shown in Expanded View B are features 520 that are located outside of but near region 520 and can be identified as unique within SEM images taken during block 350 thus enabling features 530 to serve as anchors for image registration as discussed above.

Embodiments of the disclosure can generate an accurate three-dimensional data cube of region 520 by sequentially milling away an uppermost layer of the region. The milling process can mill region 520 by scanning the FIB back and forth within the region according to a raster pattern as is known to those of skill in the art. Images of the removed portions can then be stitched together to form a highly precise three-dimensional data cube as discussed above.

Additional Embodiments

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

Also, while different embodiments of the disclosure were disclosed above, the specific details of particular embodiments may be combined in any suitable manner without departing from the spirit and scope of embodiments of the disclosure. Further, it will be apparent to one of ordinary skill in the art that many modifications and variations are possible in view of the above teachings. It is, therefore, to be understood that the appended claims are intended to cover all such modifications and changes as fall within the true spirit of the embodiments of the disclosure.

Additionally, any reference in the specification above to a method should be applied mutatis mutandis to a system capable of executing the method and should be applied mutatis mutandis to a computer program product that stores instructions that once executed result in the execution of the method. Similarly, any reference in the specification above to a system should be applied mutatis mutandis to a method that may be executed by the system should be applied mutatis mutandis to a computer program product that stores instructions that can be executed by the system; and any reference in the specification to a computer program product should be applied mutatis mutandis to a method that may be executed when executing instructions stored in the computer program product and should be applied mutandis to a system that is configured to executing instructions stored in the computer program product.

Also, where the illustrated embodiments of the present disclosure can, for the most part, be implemented using electronic components and circuits known to those skilled in the art, details of such are not be explained in any greater extent than that considered necessary as illustrated above, for the understanding and appreciation of the underlying concepts of the present disclosure and in order not to obfuscate or distract from the teachings of the present disclosure.

What is claimed is:

1. A method of evaluating a region of interest of a sample with a sample evaluation tool that includes a focused ion beam (FIB) column, a scanning electron microscope (SEM) column, and an atomic force microscope (AFM) instrument, the method comprising:
   transferring the sample into in a vacuum chamber of the sample evaluation tool;
   acquiring a plurality of two-dimensional images of the region of interest over a plurality of iterations of a delayering process by:
   (a) positioning the region of interest under a field of view of the FIB column;
   (b) milling a layer of material from the region of interest with the FIB column;
   (c) moving the region of interest under a field of view of the SEM column;
   (d) imaging the region of interest with the SEM column and measuring a depth of the milled layer in the region of interest with the AFM instrument; and
   repeating steps (a)-(d) a plurality of times without removing the sample from the vacuum chamber.

2. The method of evaluating a region of interest of a sample set forth in claim 1 further comprising generating a three-dimensional data cube representing the region of interest by stacking the plurality of two-dimensional images on top of each other in an order in which they were acquired.

3. The method of evaluating a region of interest of a sample set forth in claim 2 wherein a height of each two-dimensional image that is part of the three-dimensional data cube is determined by AFM measurements.

4. The method of evaluating a region of interest of a sample set forth in claim 1 wherein, during each iteration of the delayering process, milling a layer of material from the region of interest with the FIB column comprises scanning a focused ion beam generated by the FIB column across the region of interest a plurality of times prior to moving the region of interest under the field of view of the SEM column.

5. The method of evaluating a region of interest of a sample set forth in claim 1 wherein during each iteration of the delayering process, an image of a milled layer is generated with the SEM column immediately prior to measuring a depth of the milled layer with the AFM instrument.

6. The method of evaluating a region of interest of a sample set forth in claim 1 wherein during each iteration of the delayering process, a depth of the milled layer with the AFM instrument is measured immediately prior to generating an image of a milled layer with the SEM column.

7. The method of evaluating a region of interest of a sample set forth in claim 2 wherein the step of acquiring a plurality of two-dimensional images of the region of interest further comprising aligning the plurality of two-dimensional images to each other prior to generating the three-dimensional data cube.

8. The method of evaluating a region of interest of a sample set forth in claim 1 wherein the sample is a semiconductor wafer.

9. A system for evaluating a region of a sample, the system comprising:
   a vacuum chamber;
   a focused ion beam (FIB) column configured to direct a charged particle beam into the vacuum chamber toward the sample;
   a scanning electron microscope (SEM) column configured to direct a charged particle beam into the vacuum chamber toward the sample;
   a sample support configured to hold a sample within the vacuum chamber during a sample evaluation process and move the sample between a field of view of the FIB column and the SEM column;
   an atomic force microscope (AFM) instrument configured to measure a height of features on the sample while the sample is positioned on the sample support; and
   a processor and a memory coupled to the processor, the memory including a plurality of computer-readable instructions that, when executed by the processor, cause the system to:
   transfer the sample into in the vacuum chamber; and
   acquire a plurality of two-dimensional images of a region of interest on the sample over a plurality of iterations of a delayering process by:
   (a) positioning the region of interest under a field of view of the FIB column;
   (b) milling a layer of material from the region of interest with the FIB column;
   (c) moving the region of interest under a field of view of the SEM column;
   (d) imaging the region of interest with the SEM column and measuring a depth of the milled layer in the region of interest with the AFM instrument; and
   repeating steps (a)-(d) a plurality of times without removing the sample from the vacuum chamber.

10. The system according to claim 9 wherein the computer-readable instructions further comprise instructions for generating a three-dimensional data cube representing the region of interest by stacking the plurality of two-dimensional images on top of each other in an order in which they were acquired.

11. The system according to claim 10 a height of each two-dimensional image that is part of the three-dimensional data cube is determined by AFM measurements.

12. The system according to claim 10 wherein acquiring a plurality of two-dimensional images of the region of interest further comprises aligning the plurality of two-dimensional images to each other prior to generating the three-dimensional data cube.

13. The system according to claim 9 wherein, during each iteration of the delayering process, milling a layer of material from the region of interest with the FIB column comprises scanning a focused ion beam generated by the FIB column across the region of interest a plurality of times prior to moving the region of interest under the field of view of the SEM column.

14. The system according to claim 9 wherein the sample is a semiconductor wafer.

15. A non-transitory computer-readable memory that stores a plurality of computer-readable instructions for evaluating a region of interest on a sample by:
   transferring the sample into in a vacuum chamber of the sample evaluation tool that includes a focused ion beam (FIB) column, a scanning electron microscope (SEM) column, and an atomic force microscope (AFM) instrument; and
   acquiring a plurality of two-dimensional images of the region of interest over a plurality of iterations of a delayering process by:
   (a) positioning the region of interest under a field of view of the FIB column;
   (b) milling a layer of material from the region of interest with the FIB column;
   (c) moving the region of interest under a field of view of the SEM column;
   (d) imaging the region of interest with the SEM column and measuring a depth of the milled layer in the region of interest with the AFM instrument; and
   repeating steps (a)-(d) a plurality of times without removing the sample from the vacuum chamber.

16. The non-transitory computer-readable memory set forth in claim 15 wherein the computer-readable instructions for evaluating the region of interest on the sample further comprise instructions for generating a three-dimensional data cube representing the region of interest by stacking the plurality of two-dimensional images on top of each other in an order in which they were acquired.

17. The non-transitory computer-readable memory set forth in claim 16 wherein a height of each two-dimensional image that is part of the three-dimensional data cube is determined by AFM measurements.

18. The non-transitory computer-readable memory set forth in claim 15 wherein, during each iteration of the delayering process, milling a layer of material from the region of interest with the FIB column comprises scanning a focused ion beam generated by the FIB column across the region of interest a plurality of times prior to moving the region of interest under the field of view of the SEM column.

19. The non-transitory computer-readable memory set forth in claim 15 wherein acquiring a plurality of two-dimensional images of the region of interest further comprises aligning the plurality of two-dimensional images to each other prior to generating the three-dimensional data cube.

20. The non-transitory computer-readable memory set forth in claim 15 wherein the sample is a semiconductor wafer.

* * * * *